April 12, 1966   D. E. DRAYER   3,245,970
METHOD FOR COAGULATION OF COLLOIDAL DISPERSIONS
Original Filed Nov. 2, 1959
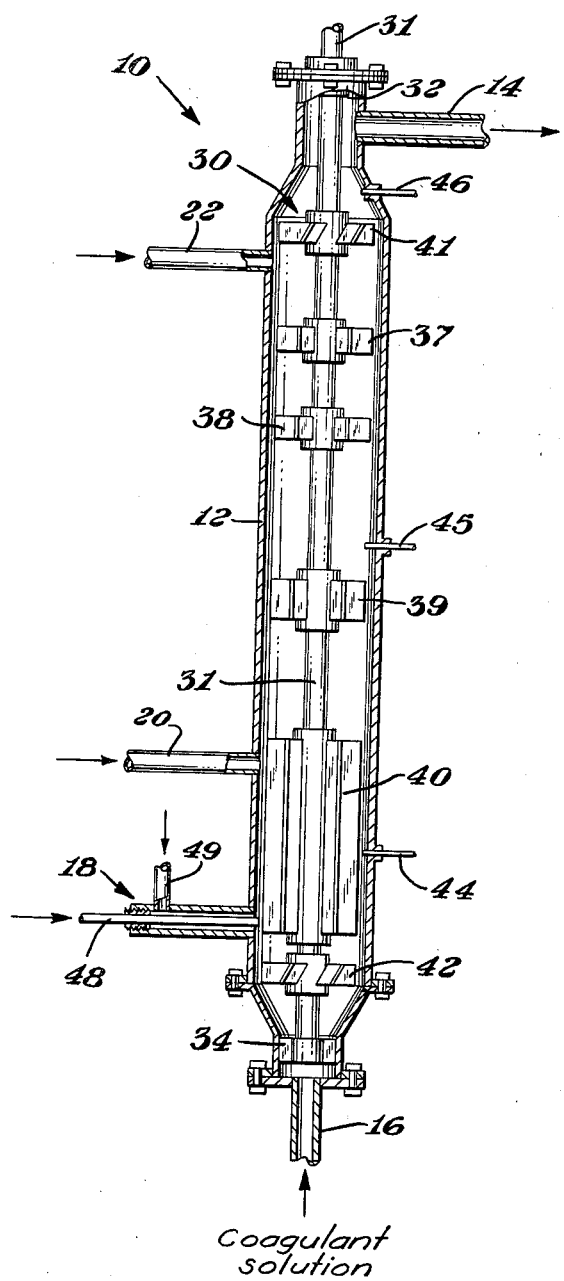
Coagulant solution
INVENTOR.
Dennis E. Drayer
BY
AGENT

United States Patent Office 3,245,970
Patented Apr. 12, 1966

3,245,970
METHOD FOR COAGULATION OF COLLOIDAL DISPERSIONS
Dennis E. Drayer, Littleton, Colo., assignor to The Dow Chemical Company, Midland, Mich., a corporation of Delaware
Original application Nov. 2, 1959, Ser. No. 850,394, now Patent No. 3,179,380, dated Apr. 20, 1965. Divided and this application Oct. 19, 1962, Ser. No. 231,808
6 Claims. (Cl. 260—91.7)

This application is a divisional application of my copending application Serial No. 850,394, filed November 2, 1959, now U.S. Patent 3,179,380.

This invention relates to a method for the coagulation of colloidal dispersions. It more particularly relates to a method for the continuous coagulation of synthetic latices and like colloidal dispersions.

It is conventional practice to prepare various synthetic resins by polymerizing an aqueous dispersion of monomeric material in the presence of a micelle-forming surface active agent, thereby preparing a relatively stable colloidal dispersion of the synthetic resinous material in water. Such a dispersion is usually referred to as a synthetic latex.

Such a process is frequently referred to as the emulsion polymerization technique. It is frequently employed to obtain polymers and copolymers having particularly desirable properties which are not easily and economically prepared by other polymerization methods.

Conventionally, such resins have been separated from the liquid medium by the addition of electrolytes to the colloidal dispersion. This results in coagulation of the resin from the dispersion. Frequently, it is desirable to coagulate this type of dispersion in such a manner that the product is separated as a granular material that contains only a relatively small portion of water. In contrast, some coagulating techniques may result merely in the formation of a paste-like mass. Frequently, this problem is solved by diluting the latex to a solids content in the range of about 5 to about 25 weight percent, based on the total weight of the dispersion.

Usually suitable electrolyte solutions employed as coagulants contain polyvalent anions, although monovalent anions may frequently be employed. The dispersion is agitated and the temperature is raised until the formation of granular material has been obtained. When agitation ceases, the granular material settles and the aqueous phase is substantially free of resinous material. The heating frequently serves to give a more solid processable granule or crumb.

The resulting slurry is allowed to settle and the supernatant liquid decanted. The solids are reslurried in fresh portions of water to remove excess electrolyte and other water-soluble contaminants which may be present, such as surface active agents and residual salts from the catalysts. After the required number of washing cycles have been performed, the product is again slurried, filtered, and dried.

The crumb or granule prepared by such a process should have sufficient mechanical strength to withstand filtration and shipping. The granules should have sufficient mechanical strength so that attrition will not take place during processing or shipping.

Coagulation by the batch technique generally requires large equipment occupying a large area. Also, a batch coagulation will take many hours to complete.

Coagulating operations are very sensitive to minor changes in the latex particle size, particle size distribution, the method of polymerization, the quantity, and the type of surface active agent employed during the polymerization, and the distribution of the surface active agent between the water phase and the surface of the latex particle after the polymerization is complete. Consequently, appreciable variations in the latex coagulation characteristics may occur between batches of the finished latex, despite the fact that the resin recovered from various latex batches may appear to have substantially identical physical properties, such as molecular weight and the like.

Variations in basic latex coagulation characteristics can give rise to serious difficulties in batch coagulation operations. These variations often require that a series of pilot or experimental coagulation runs be made prior to the coagulation of a freshly prepared batch of latex. Only through long experiences in correlating pilot or other experimental or developmental runs with large scale runs made with the same latex can a reasonable prediction of large scale conditions be made. Such a procedure leaves an undesirable area of uncertainty and may frequently incur excessive expense and additional labor.

It is well-known practice to coagulate synthetic latices into sheets, and to express the entrapped liquid from the coagulant by means of pressure rolls or similar apparatus. The resultant sheet is ground, washed, and dried. A procedure of this type is relatively costly and disadvantageously yields an undesirable type of crumb having a very high internal surface which usually occludes a large quantity of the polymerization medium within the crumb.

It is desirable that as much as possible of the coagulant and the polymerization medium be removed prior to the drying in order that the resultant resin may have the maximum light and heat stability.

It would be advantageous if there were available a method for the coagulation of synthetic latices and like colloidal dispersions which were simple and would prepare a desired granule or crumb.

It would also be beneficial if such a method would permit the apparatus to be capable of rapid adjustment to compensate for variations in the starting materials.

Further, it would be advantageous if such a method and apparatus were capable of coagulating a synthetic latex or like colloidal dispersion with a minimum exposure of the desired product to higher temperature.

It would be most beneficial if such a method and apparatus were capable of providing a product which has a relatively uniform and readily controllable crumb size.

It would also be most advantageous if such a method and apparatus would provide a crumb having good mechanical stability and high resistance to dusting and attrition.

These advantages and other benefits may be obtained by providing a generally cylindrical and substantially vertically disposed coagulating vessel having a length to diameter ratio of at least 8:1; the generally cylindrical walls of said vessel having therein a discharge port positioned near the top of said vessel, one inlet port near the bottom of the vessel, and at least three inlet ports disposed in spaced vertical relationship between the bottom and the top ports; with the apparatus having an agitator in said vessel extending vertically downward into the vessel a distance of at least about 80 percent of the length of the vessel.

A colloidal dispersion may be coagulated according to the method of the invention by providing a helically flowing stream of coagulant, introducing into said stream of coagulant a stream of latex, introducing into the latex-coagulant stream a heated diluent for said latex; and subsequently introducing a cold liquid diluent for said latex into said hot diluted-latex-coagulant stream.

Further features and advantages of the invention will become apparent from the following description and specification, when taken in conjunction with the accompanying drawing, wherein the sole figure is a schematic representation of a cross-sectional view of a coagulating vessel constructed in accordance with the invention.

There is shown in the drawing a coagulating apparatus or coagulator which is indicated generally by the reference number 10. The coagulator 10 comprises a coagulating vessel 12 having a length to diameter ratio of at least 8:1. At the upper end of the vessel 12 there is positioned a discharge port 14. At the lower or bottom end of the vessel 12 is a coagulant inlet or port 16. Intermediate between the ports 14 and 16 is a latex inlet or port 18, a hot water inlet or port 20, and a cold water inlet or port 22.

Rotatably supported within the vessel is an agitator which is indicated generally by the reference number 30. The agitator is made up of the shaft 31 and turbine type impellers 37, 38, 39 and 40 affixed thereon. Also affixed to the shaft 31 and rotating therewith are forwarding or pumping impellers 41 and 42. The agitator 30 is supported at the top by a bearing 32 and at the bottom by a bearing 34. Positioned within the generally cylindrical wall of the coagulating vessel 12 are thermocouples 44, 45, and 46. The latex inlet port 18 is a coaxial inlet comprising a latex supply conduit 48 and annular water supply port 49.

In accordance with the method of the present invention, a coagulant solution is introduced through the port 16. Water near the temperature of the latex is introduced through annular supply port 49. Hot water is fed into port 20. Cold water is introduced into the vessel in the upper section through port 22. The flow rates of the coagulant and water into the latex port 18 and the hot and cold water to ports 20 and 22, respectively, are adjusted to result in suitable temperatures within the coagulator. Such an operation is facilitated by the thermocouples 44, 45, and 46. In their absence, however, calculation based on flow rate and temperature of the various streams will readily result in a reasonable close approximation of the desired temperature.

Rotation of the agitator 30 is then initiated. The latex to be coagulated is introduced through the latex conduit 48. The resulting product slurry is delivered from the discharge port 14 and thereafter processed by conventional means.

The inventory time of the polymer in the coagulator 10 is generally desired to be on the order of one-half to 10 minutes, depending on the particular latex which is employed. In general, latices which may be coagulated by batch techniques may be coagulated by the practice of the invention. In this connection, latices to which the method of the invention may be employed with particular advantage are described in United States Letters Patent Numbers 2,538,025 and 2,640,050.

In general, the crumb size may be increased by decreasing the speed of agitation or decreased by increasing the speed of agitation. It is usually advantageous to employ a variable speed drive in conjunction with the agitator 30 to facilitate control of crumb size. If the concentration of the coagulant is raised or the rate of flow to the coagulant port 16 is increased, the crumb size is usually increased. Also, as the temperature of the coagulant is raised, the crumb size exhibits a tendency to increase.

A similar increase of crumb size may frequently be obtained by increasing the temperature of the water fed through the port 20. If the temperature of the water to the port 20 of the coagulant fed to the port 16 is increased appreciably above the softening point of the resin being coagulated, there will be a tendency for very large particles to be formed; some change in particle size may also be obtained by altering the design and size of the impeller employed in the vicinity of port 18.

Generally, more violent agitation in the lower section of the vessel adjacent to port 18 will result in reduced particle size. Although the agitation is further increased, a tendency will be noted for the coagulant particle to be pressed together to form larger crumbs. If agitation is still further increased, the polymer will tend to accumulate on the walls of the agitator in this area. Similar build-up of polymer will result if the coagulant temperature is too hot or the concentration of the coagulant is too low. For a given type of latex, such temperatures and conditions may be determined by small scale batch laboratory coagulation and the optimum coagulating conditions obtained by minor adjustments or flow rates, agitation, and temperatures in the continuous coagulating apparatus of the present invention.

When employing latices prepared in accordance with United States Letters Patent Numbers 2,640,050 and 2,538,025, it is usually desirable to provide the forwarding or pumping impellers 41 and 42 in substantially the positions illustrated. However, when employing latices containing resins having densities that more closely approach that of water, the pumping impellers 41 and 42 may be omitted. If the length to diameter of the coagulating vessel is in a ratio that is appreciably higher than 8:1, respectively, the rate of flow is frequently sufficient to overcome the settling effect of the higher density polymer in the coagulating medium. In such cases the forwarding impellers are not necessary.

Various configurations of the impellers may be employed. No particular shape or design is found to be critical. A change of the impeller's position may require a slight alteration of temperature or a flow rate. In general, the impellers should have a clearance from the inner walls of the vessel 12 that is in excess of about two particle diameters of the coagulated product being prepared. However, closer clearances may be employed, if desired.

In the drawing, port 16 has been illustrated as providing a stream of coagulant flowing substantially and generally axially with respect to shaft 31 and bearing 34. In this way, the constant flushing action of the fresh coagulant serves to prevent any accumulation of latex or coagulum in the bearing. Alternately, the coagulant could be fed into the vessel at any point below port 18. Other means may be employed to keep the bearing free, such as water lubrication or by use of conventional mechanical seals.

A coagulator in accordance with the invention may be prepared from any of the conventional materials of construction. However, generally it is desirable to employ an apparatus that is relatively corrosion resistant. The coagulating vessel may be fabricated from synthetic materials such as phenolformaldehyde resins, stainless steel (with types 316 and 304 being eminently suitable), carbon steel, brass, and the like. Similar materials of construction may be employed for the agitator. Advantageously, polytetrafluoroethylene or polyamide, such as nylon and the like, may be employed for the bearings 32 and 34.

It is frequently advantageous to employ a neutralizing solution to reduce the undesirable chemical effects of the coagulant. Other streams may also be introduced to the coagulator. For example, in a case where aluminum sulfate is employed as coagulant, it may be advantageous to add potassium or sodium hydroxide to neutralize the acidic effect of the coagulant on both the polymer and subsequent processing equipment. A port may be provided between ports 20 and 22 to facilitate such an addition.

A coagulator in accordance with the invention was constructed from type 304 stainless steel. The coagulating vessel 12 was fabricated from a 48 inch length of 3 inch Schedule 40 pipe, capped on each end with reducers carrying the agitator bearings 32 and 34. The upper reducer was provided with a 1½ inch outlet 14. Positioned along the wall of the vessel 12 were ports 18, 20 and 22, each of ½ inch pipe. The thermocouples 44, 45 and 46 were enclosed in a ⅛ inch stainless steel tubing, brazed in a ¼ inch pipe plug, and inserted into a mating opening the vessel 12 wall. The agitator had a maximum diameter of 2½ inches; the impellers were arranged as illustrated in the drawing and were rotated by a direct, connected, variable speed motor operating at a rate between about 200 and 400 revolutions per minute.

Comparative coagulations were run on similar batches of latices prepared according to United States Letters Patent 2,538,025 employing both conventional batch techniques and coagulations in accordance with the present invention. A much more uniform and desirable crumb particle size distribution was obtained when employing the apparatus of the invention than was obtained in a batch coagulation.

Coagulation rates of about 200 pounds per hour (based on dry solids) were obtained when employing latex having a solids content of about 30 percent. The heat stability of the polymer was also improved and the inorganic residues reduced as indicated by light transmission measurements made on solutions of the resultant polymers.

Many of a wide variety of latices have been successfully coagulated by the method and apparatus of the present invention. Some examples are copolymers of vinyl chloride and vinylidene chloride, varying in composition from about 10 percent vinyl chloride to about 80 percent vinyl chloride; vinylidene chloride/acrylonitrile copolymers vary in composition from about 10 percent acrylonitrile to about 30 percent acrylonitrile; and copolymers of vinylidene chloride with various acrylates, as well as similar copolymer latices.

As is apparent, the method of the invention is susceptible of being embodied with various alterations and modifications from that which has been described in the preceding description and specification. For this reason it is to be fully understood that all of the foregoing is merely intended to be illustrative and is not to be construed or interpreted as being restrictive or otherwise limiting of the present invention excepting as it is set forth and defined in the hereto appended claims.

What is claimed is:

1. A method for the coagulation of resinous colloidal dispersions, which method comprises providing a forwardly moving helically flowing stream of coagulant; introducing into said stream of coagulant a stream of latex; then adding consecutively down-stream to the latex-coagulant stream a heated diluent for said latex to form a heated diluted coagulated latex stream; and a cooler liquid for said latex into said hot diluted coagulated latex stream.

2. The method of claim 1, and including in addition thereto and in combination therewith the step of introducing to the helically flowing stream a neutralizing agent for said coagulant after said addition of latex and prior to said addition of the hot diluent.

3. The method of claim 1, wherein the latex is added coaxially with a stream of water.

4. The method of claim 1, wherein the diluent is water.

5. The method of claim 1, wherein said latex comprises a vinyl chloride polymer.

6. The method of claim 1, wherein said latex comprises a vinylidene chloride polymer.

References Cited by the Examiner

UNITED STATES PATENTS

| 2,478,229 | 8/1949 | Berry | 260—92.1 |
| 2,577,095 | 12/1951 | Walker | 261—93 |
| 2,647,103 | 7/1953 | Griffith | 260—92.8 |
| 3,052,663 | 9/1962 | Bodlaender | 260—92.8 |

JOSEPH L. SCHOFER, *Primary Examiner.*

J. F. McNALLY, *Assistant Examiner.*